(12) United States Patent
Kim et al.

(10) Patent No.: US 10,718,562 B2
(45) Date of Patent: Jul. 21, 2020

(54) REFRIGERATOR

(71) Applicant: LG ELECTRONICS INC., Seoul (KR)

(72) Inventors: Soyoon Kim, Seoul (KR); Kyunghun Cha, Seoul (KR); Kyungseok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 105 days.

(21) Appl. No.: 15/946,137

(22) Filed: Apr. 5, 2018

(65) Prior Publication Data

US 2018/0292121 A1 Oct. 11, 2018

(30) Foreign Application Priority Data

Apr. 11, 2017 (KR) ........................ 10-2017-0046658

(51) Int. Cl.
*F25D 21/12* (2006.01)
*F25B 39/00* (2006.01)
(Continued)

(52) U.S. Cl.
CPC ............ *F25D 21/125* (2013.01); *F25B 13/00* (2013.01); *F25B 39/00* (2013.01); *F25B 39/024* (2013.01); *F25D 17/062* (2013.01); *F25D 17/067* (2013.01); *F25D 17/08* (2013.01); *F25D 21/004* (2013.01); *F25D 21/006* (2013.01); *F25D 21/02* (2013.01); *F25D 21/12* (2013.01); *F25B 2600/112* (2013.01); *F25D 2317/0655* (2013.01); *F25D 2317/0661* (2013.01);

(Continued)

(58) Field of Classification Search
CPC .......... F25D 21/02; F25D 21/06; F25D 21/12; F25D 21/125; F25D 21/004; F25D 2321/00; F25D 17/062; F25D 17/067; F25D 17/08
See application file for complete search history.

(56) References Cited

U.S. PATENT DOCUMENTS 2,937,511 A 5/1960 Mann
2,986,901 A 6/1961 Hubacker
(Continued)

FOREIGN PATENT DOCUMENTS

EP           2 426 450        3/2012
KR      10-2016-0023105       3/2016
WO       WO 2016/036005      3/2016

OTHER PUBLICATIONS

European Search Report dated Sep. 13, 2018 issued in Application No. 18166617.3.

*Primary Examiner* — Nelson J Nieves
(74) *Attorney, Agent, or Firm* — KED & Associates LLP

(57) ABSTRACT

A refrigerator a duct arranged to partition an inner space of a storage chamber body into a storage chamber and an air flow channel, wherein the duct has an ejection hole defined therein; a roll-bond evaporator disposed in the air flow channel, wherein the roll-bond evaporator has a top and a bottom, a left end and a right end; a blowing fan configured to draw air from the storage chamber to blow the air into the air flow channel; and a defrost sensor closer to one of the top and bottom than the other of the top and the bottom, wherein said one is closer to the blowing fan than the other, wherein the sensor is closer to one of the left end and the right end than the other of the left end and the right end.

22 Claims, 9 Drawing Sheets

(51) Int. Cl.
  *F25D 17/06* (2006.01)
  *F25B 13/00* (2006.01)
  *F25D 21/00* (2006.01)
  *F25D 21/02* (2006.01)
  *F25D 17/08* (2006.01)
  *F25B 39/02* (2006.01)

(52) U.S. Cl.
  CPC ............... *F25D 2317/0671* (2013.01); *F25D 2317/0681* (2013.01); *F25D 2317/0683* (2013.01); *F25D 2700/10* (2013.01); *Y02B 30/743* (2013.01)

(56) References Cited

U.S. PATENT DOCUMENTS

| | | | | |
|---|---|---|---|---|
| 3,872,683 | A * | 3/1975 | Blanton | F25D 21/02 62/140 |
| 4,535,600 | A * | 8/1985 | Gelbard | F25B 39/024 62/156 |
| 4,860,551 | A * | 8/1989 | Query | F25D 21/02 62/140 |
| 2005/0183427 | A1* | 8/2005 | Dudley | F25D 21/006 62/80 |
| 2005/0217286 | A1* | 10/2005 | Jeong | F25D 21/08 62/151 |
| 2006/0242973 | A1* | 11/2006 | Manettas | F25D 21/02 62/151 |
| 2010/0126191 | A1* | 5/2010 | Han | F25D 21/02 62/80 |
| 2012/0023974 | A1* | 2/2012 | Park | F25D 21/006 62/80 |
| 2012/0047922 | A1 | 3/2012 | Lee et al. | |
| 2013/0031921 | A1* | 2/2013 | Hamada | F24F 13/222 62/155 |
| 2013/0081415 | A1* | 4/2013 | Kim | F25D 21/006 62/129 |
| 2013/0081416 | A1* | 4/2013 | Kim | F25D 21/006 62/151 |
| 2016/0054047 | A1* | 2/2016 | Lim | F25D 17/062 |
| 2017/0191733 | A1* | 7/2017 | Li | F25D 21/02 |
| 2017/0284724 | A1* | 10/2017 | Lee | F25D 11/022 |

* cited by examiner

REFRIGERATOR

CROSS-REFERENCE TO RELATED APPLICATION

This application claims the benefit of Korean Patent Application No. 10-2017-0046658, filed on Apr. 11, 2017, the subject matter of which is incorporated herein by reference.

BACKGROUND

1. Field

The present disclosure relates to a refrigerator, and more particularly, to a refrigerator with a defrost sensor that senses an evaporator temperature.

2. Background

The refrigerator is a device that prevents decay and modification of the to-be-cooled object (hereinafter referred to as "food") such as food, medicines, cosmetics etc. by keeping them cold or storing them at low temperature.

The refrigerator may include a storage chamber where food is stored and a cooling device that cools a storage chamber.

The cooling device may include a compressor, a condenser, an expander, and an evaporator through which the refrigerant circulates.

The refrigerator may further include a blowing fan for circulating air in the storage chamber into the evaporator and the storage chamber. The blowing fan may be disposed around the evaporator. The fan may be configured such that air in the storage chamber flows into the evaporator and then back to the storage chamber.

The refrigerator may be frosted on the evaporator for extended periods of time, and thus, the refrigerator may perform a defrost operation to remove the evaporator's frost.

The refrigerator may raise a temperature of the evaporator during the defrost operation. If the temperature of the evaporator is sufficiently raised, the defrost operation may be terminated.

The defrost sensor for detecting the temperature of the evaporator may be installed in the evaporator. The temperature sensed by the defrost sensor may be used to determine the end of the defrost operation.

The refrigerator may use a fin tube type heat-exchanger or a roll-bond type heat-exchanger as an evaporator.

The roll-bond type heat-exchanger may be thinner in the front-rear direction than the fin-tube type heat-exchanger. The refrigerator that includes the roll-bond type heat-exchanger may have a larger storage chamber volume than the refrigerator that includes the fin tube type heat-exchanger.

An example of the refrigerator including the roll-bond type heat-exchanger as an evaporator is disclosed in Korean Patent Laid-Open Publication No. 10-2016-0023105 A (published Mar. 3, 2016). In the refrigerator, the roll-bond type heat-exchanger is spaced apart from the rear plate disposed inside the refrigerator. There are a plurality of flow paths partitioned by the roll-bond type heat exchanger at the rear of the rear plate.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
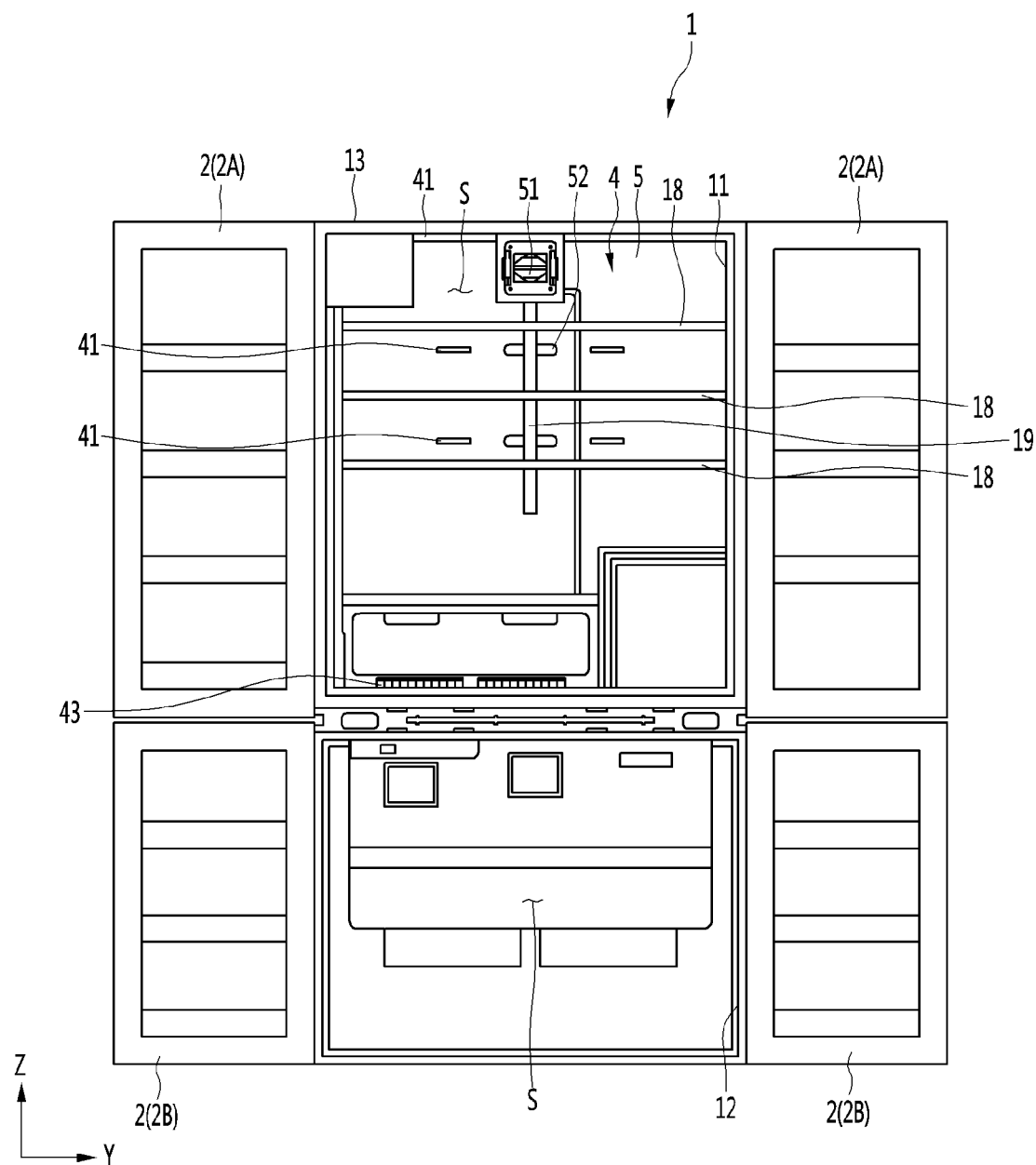
FIG. 1 is a front view of a storage chamber of a refrigerator when opened, according to one embodiment of the present disclosure.

For simplicity and clarity of illustration, elements in the figures are not necessarily drawn to scale. The same reference numbers in different figures denote the same or similar elements, and as such perform similar functionality. Also, descriptions and details of well-known steps and elements may be omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits may not have been described in detail so as not to unnecessarily obscure aspects of the present disclosure.

Examples of various embodiments are illustrated and described further below. It will be understood that the description herein is not intended to limit the claims to the specific embodiments described. The description is intended to cover alternatives, modifications, and equivalents as may be included within the spirit and scope of the present disclosure as defined by the appended claims.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

Spatially relative terms, such as "beneath," "below," "lower," "under," "above," "upper," and the like, may be used herein for ease of explanation to describe one element or feature's relationship to another element or feature as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented for example, rotated 90 degrees or at other orientations, and the spatially relative descriptors used herein should be interpreted accordingly.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Unless otherwise defined, all terms including technical and scientific terms used herein may have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, numerous specific details are set forth in order to provide a thorough understanding of the present disclosure. The present disclosure may be practiced without some or all of these specific details. In other instances, well-known process structures and/or processes may not have been described in detail in order not to unnecessarily obscure the present disclosure.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure."

FIG. 1 is a front view of a storage chamber of a refrigerator when opened, according to one embodiment of the present disclosure. Other embodiments and configurations may also be provided.

The refrigerator includes a main body 1 having a storage chamber S defined therein, and a door 2 opening and closing the storage chamber S.

The main body 1 may include storage chamber bodies 11 and 12 having the storage chamber S defined therein.

The storage chamber bodies 11 and 12 may have open front faces. The body may include an upper plate, a lower plate, a left plate, a right plate, and a rear plate.

The main body 1 may include an outer case 13 forming the appearance of the refrigerator.

The main body 1 may include a thermal insulating material 14 disposed between the storage chamber bodies 11 and 12 and the outer case 13.

The upper and lower storage chamber bodies 11 and 12 may form the main body 2.

The main body 1 may include a thermal insulating material disposed between the storage chamber bodies 11 and 12.

The refrigerator may contain at least two storage chambers. These storage chambers may be cooled to have a temperature difference. In this example, one of the at least two storage chambers may be a refrigerating chamber having a room temperature range, and the other one of the storage chambers may be a freezing chamber having a below-zero temperature range.

The refrigerator may have both the refrigerating chamber and the freezing chamber. The main body 1 may include the storage chamber body 11 having the refrigerating chamber defined therein and the storage chamber body 12 having the freezing chamber defined therein.

At least one door 2 may be provided at the refrigerator. When the main body 1 includes a plurality of storage chamber bodies 11 and 12, the door 2 may include a plurality of doors 2A and 2B disposed at the main body 1.

At least one door 2A (of the plurality of doors 2A and 2B) can open and close the storage chamber formed in any one of a plurality of storage chamber bodies 11 and 12. At least another door 2B (of the plurality of the doors 2A and 2B) may open and close the storage chamber formed in the other one of the plurality of storage chamber bodies 11 and 12.

The plurality of storage chamber bodies 11 and 12 may include a refrigerating chamber body 11 having the refrigerating chamber defined therein and a freezing chamber body 12 having the freezing chamber defined therein.

The plurality of doors 2A, 2B may include the refrigerating chamber door 2A opening and closing the refrigeration chamber and the freezing chamber door 2B opening and closing the freezing chamber.

The refrigerator may also include a duct 4 that ejects air into the storage chamber S.

The duct 4 may be disposed in the inner space of the storage chamber body 11. The duct 4 may eject air into the storage chamber S while being positioned in the inner space of the storage chamber bodies 11 and 12.

The duct 4 may be located inside the storage chamber body 11 and may act as an injection cover configured for ejecting cold air into the storage chamber S.

In the duct 4, an ejection hole 41 may be formed therein for ejecting air into the storage chamber S.

The duct 4 can be disposed in front of the rear plate of the storage chamber body 11. In this example, the ejection hole 41 may be opened in the forward and backward direction X.

Alternatively, the duct 4 may be disposed on the right side of the left plate of the storage chamber body 11 or on the left side of the right plate of the storage chamber body 11. In this example, the ejection hole 41 may be opened in the left-right direction Y.

The ejection hole 41 is the storage chamber ejection hole for ejecting air into the storage chamber S.

The ejection hole 41 may be formed in the duct 4 in a plural manner. A plurality of ejection holes 41 may have different heights in the duct 4. The uppermost main ejection hole (located at the uppermost position among the plurality of ejection holes 41) may be formed at a height closer to the upper plate among the upper plate and the upper plate of the storage chamber body 11. The lowermost main ejection hole (located at the lowest position among the plurality of ejection holes 41) may be formed closer to the lower plate among the upper plate and the lower plate of the storage chamber body 11. The plurality of ejection holes 41 may include a central main ejection hole located between the uppermost main ejection hole and the lowermost main ejection hole.

In the refrigerator, an intake hole 43 may be formed through which the air in the storage chamber is sucked into the duct 4. The intake hole 43 may be in the duct 4 or between the duct 4 and the storage chamber body 11.

The refrigerator may include a shelf 18 disposed within the storage chamber S. The shelf 18 may be provided in the storage chamber S in a plural manner. The shelf 18 may be disposed at a height such that is the shelf 18 does not block the ejection hole 41. The shelf 18 may also be placed in a height-adjustable manner on the duct 4. The duct 4 may have a shelf fixation 19 to which the shelf 18 is fixed.

An example in which the duct 4 is disposed in front of the rear plate of the storage chamber body 11 may be described.

Figure 2:
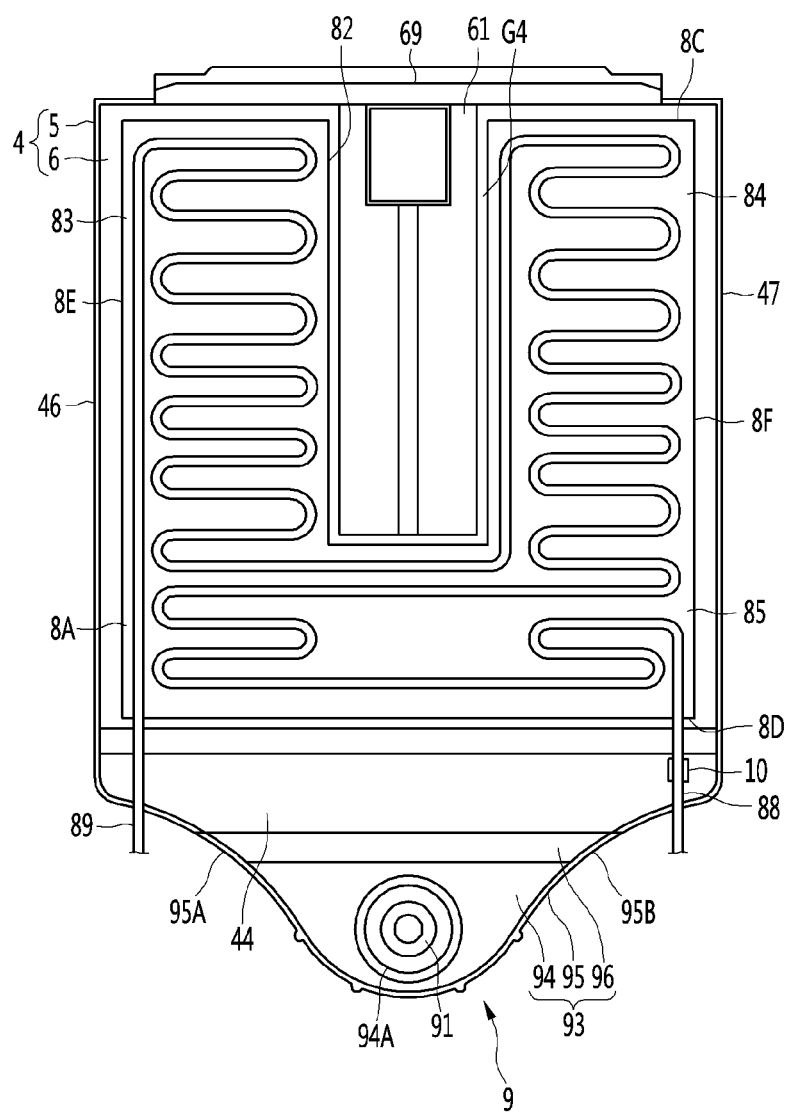
FIG. 2 is a rear view of a duct together with a front roll-bond evaporator and a blowing fan of the refrigerator according to one embodiment of the present disclosure.
Figure 3:
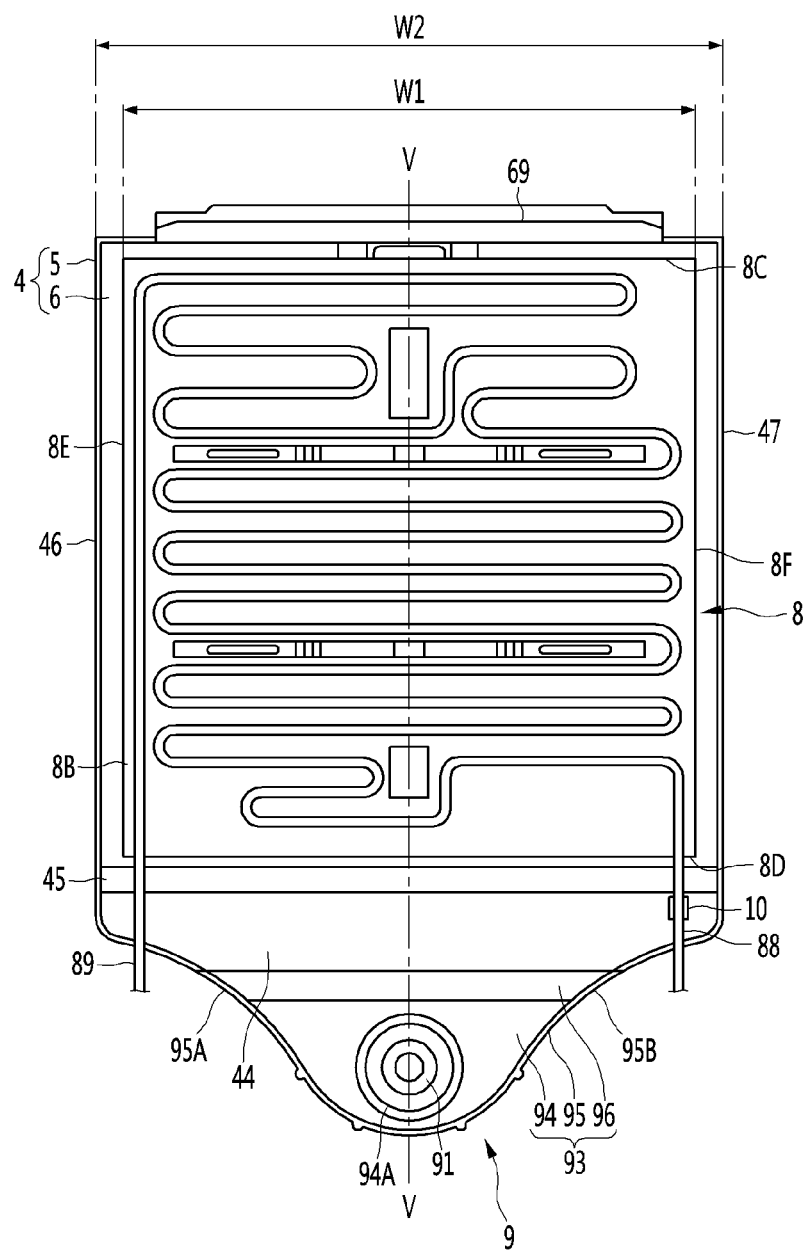
FIG. 3 is a rear view of a duct together with a rear roll-bond evaporator and a blowing fan of the refrigerator according to one embodiment of the present disclosure.
Figure 4:
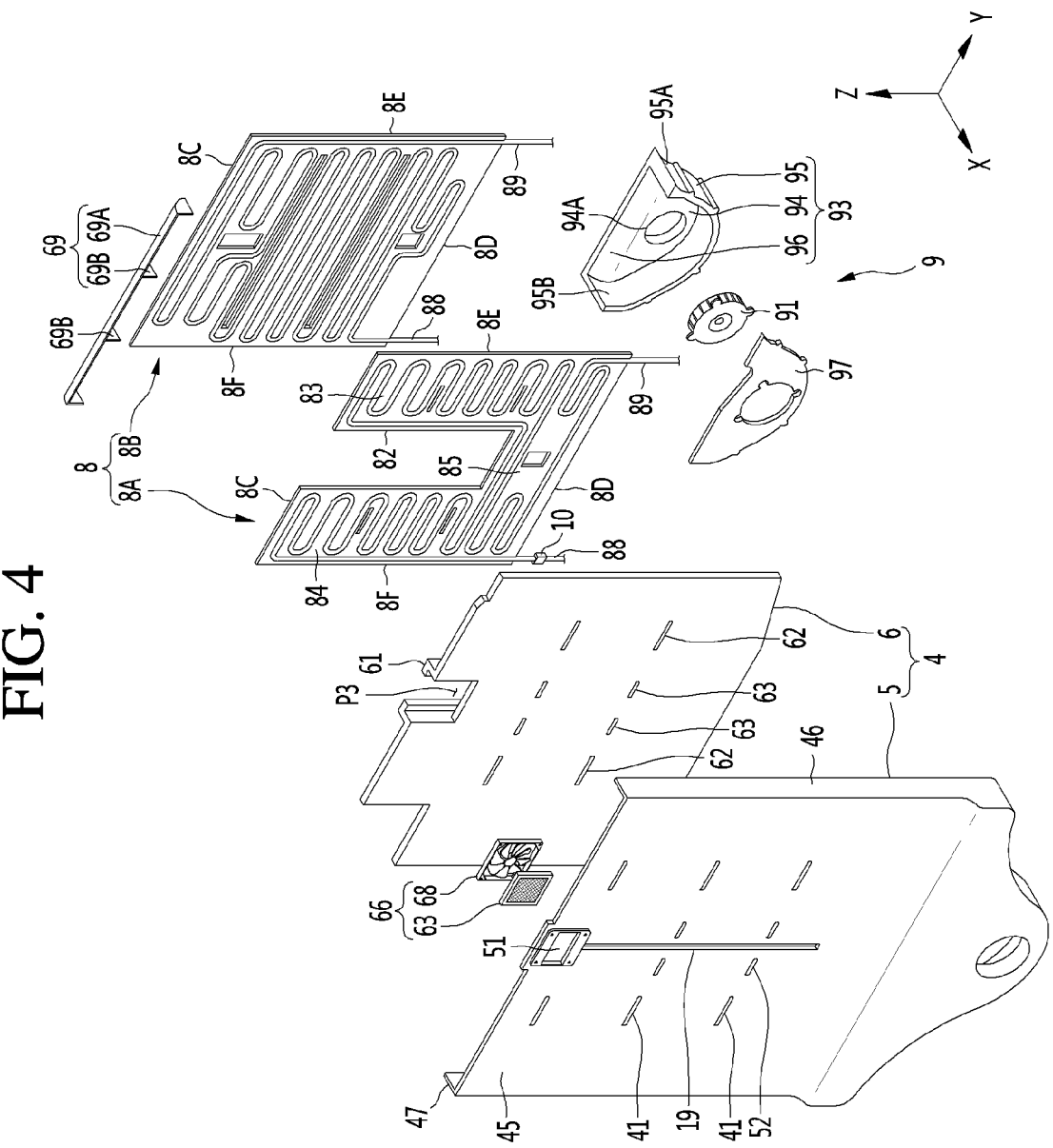
FIG. 4 is a front exploded perspective view of a duct, a roll-bond evaporator and a fan motor according to one embodiment of the present disclosure.
Figure 5:
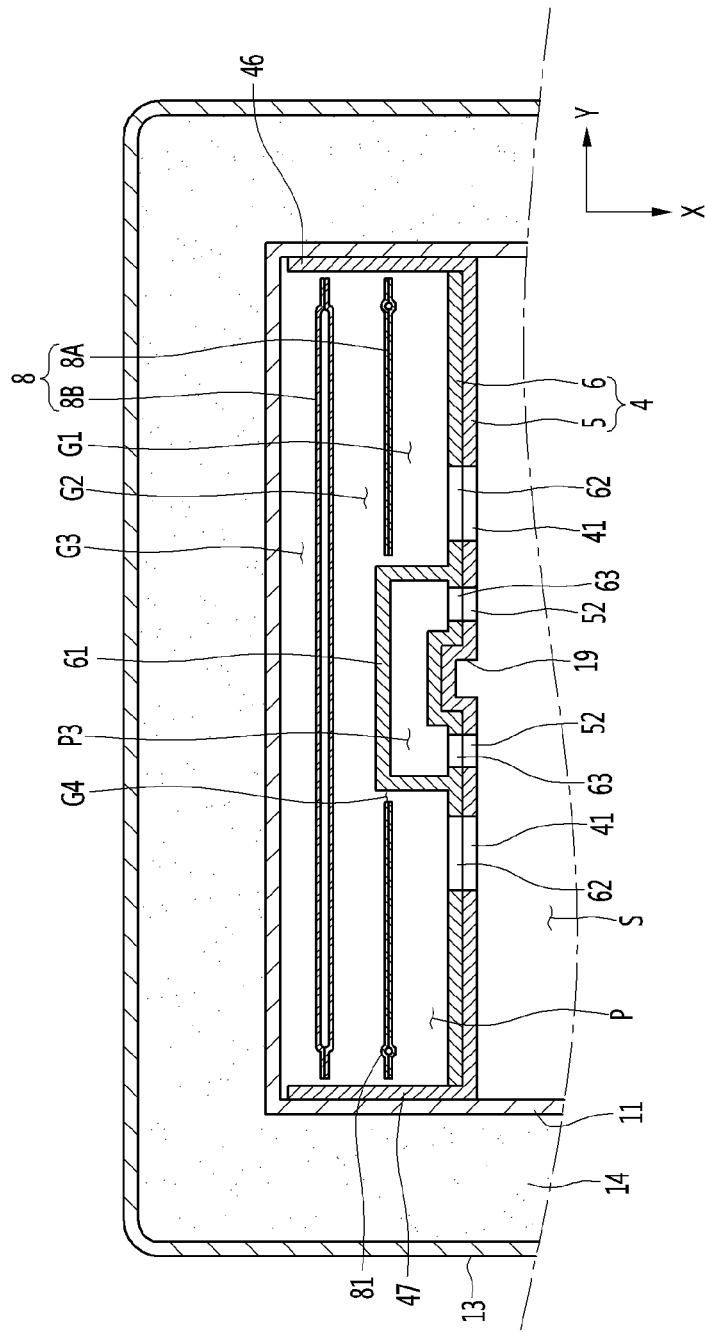
FIG. 5 is a cross-sectional view of a duct and a roll-bond evaporator of a refrigerator according to one embodiment of the present disclosure.
Figure 6:
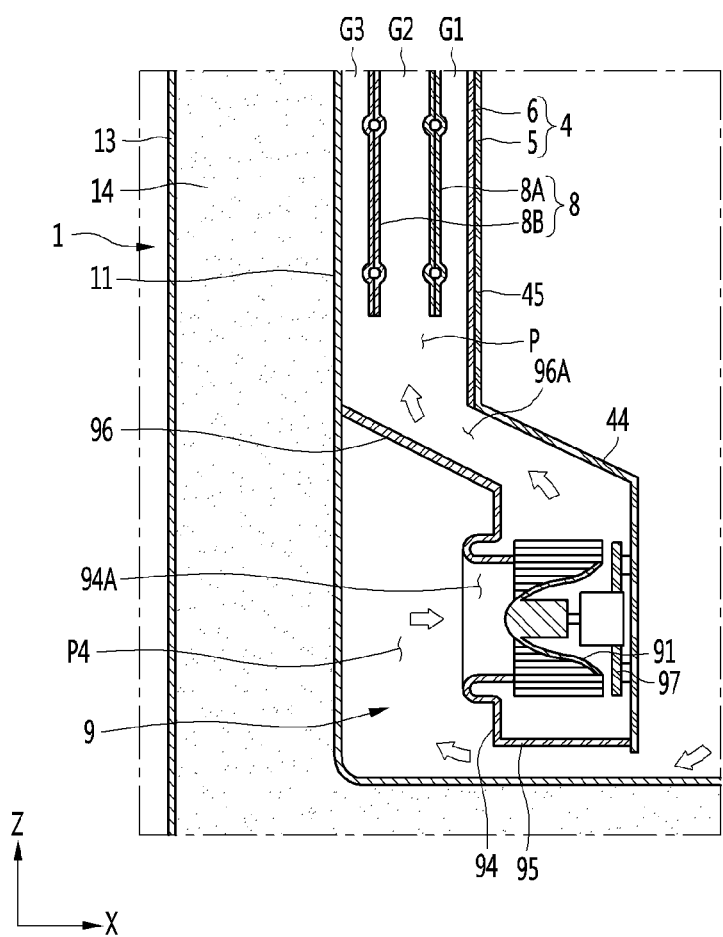
FIG. 6 is a vertical cross sectional view of a duct and a roll-bond evaporator and a blowing fan of a refrigerator according to one embodiment of the present disclosure.
Figure 7:
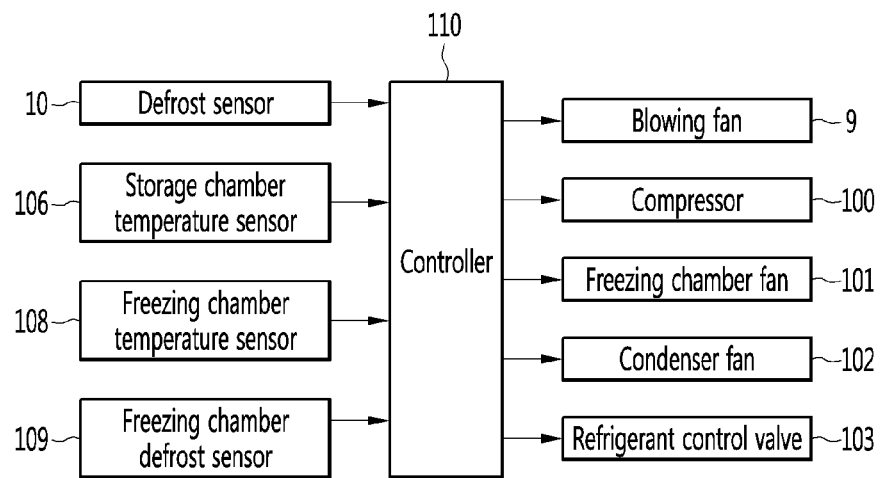
FIG. 7 shows a control block diagram of a refrigerator according to one embodiment of the present disclosure.

FIG. 2 is a rear view of the duct together with a front roll-bond evaporator and a blowing fan of the refrigerator according to one embodiment of the present disclosure. FIG. 3 is a rear view of the duct together with a rear roll-bond evaporator and a blowing fan of the refrigerator according to one embodiment of the present disclosure. FIG. 4 is a front exploded perspective view of the duct, the roll-bond evaporator and the fan motor according to one embodiment of the present disclosure. FIG. 5 is a cross-sectional view of the duct and the roll-bond evaporator of the refrigerator according to one embodiment of the present disclosure. FIG. 6 is a vertical cross sectional view of the duct and the roll-bond evaporator and the blowing fan of the refrigerator according to one embodiment of the present disclosure. FIG. 7 shows the control block diagram of the refrigerator according to one embodiment of the present disclosure. Other embodiments and configurations may also be provided.

The refrigerator may include the duct 4, the roll-bond evaporator 8, and the blowing fan 9, and the defrost sensor 10.

The duct 4 may be divide the inner space of the storage chamber body 11 into the storage chamber S and the air flow channel P, as shown in FIG. 5.

The duct 4, the roll-bond evaporator 8, the blowing fan 9 and the defrost sensor 10 may act as a cooled air supply 4, 8, 9, and 10 to draw air in the storage chamber S, cool the air, and eject the cooled air back into the storage chamber S.

In one example, the duct 4, the roll-bond evaporator 8, the blowing fan 9, and the defrost sensor 10 may be disposed together in the interior space of each of the plurality of storage chamber bodies 11 and 12.

In another example, the duct 4, the roll-bond evaporator 8, the blowing fan 9, and the defrost sensor 10 may be disposed together within one of the plurality of storage chamber bodies 11 and 12.

Reference may be made to the example where the duct 4, the roll-bond evaporator 8, the blowing fan 9, and the defrost sensor 10 may be disposed together in the interior space of the body 11 among the plurality of storage chamber bodies 11 and 12. However, embodiments are not limited to the configuration in which the cooled-air supply 4, 8, 9, and 10 is disposed in the inner space of the storage chamber body 11 forming the refrigerating chamber. For example, the cooled-air supply 4, 8, 9, and 10 according to the present embodiment may be disposed in the inner space of the storage chamber body 12 forming the freezing chamber.

The duct 4 may be described in detail.

In the duct 4, the ejection hole 41 may be formed through which air in the air flow channel P is ejected into the storage chamber S. The ejection hole 41 may allow the storage chamber S and the air flow channel P to communicate with each other.

The ejection hole 41 may face the storage chamber S. Air in the air flow channel P may be ejected into the storage chamber S through the ejection hole 41.

In the duct 4, the clean flow channel P3 through which air in the storage chamber S passes may be formed. The channel P3 may be formed separately from the air flow channel P. The duct 4 may include the clean flow channel body 61 having the clean flow channel P3 defined therein. The clean flow channel body 61 may separate the clean flow channel P3 from the air flow channel P. The clean flow channel body 61 may be part of the duct 4. The clean flow channel P3 and the air flow channel P may be configured not to communicate directly with each other.

The air in the storage chamber S, which is sucked into the clean flow channel P3, may not flow into the air flow channel P from the clean flow channel P3. The air in the storage chamber S, which is sucked into the clean flow channel P3, may be ejected through the clean flow channel P3 and then through the clean ejection hole 52 into the storage chamber S.

The air sucked into the air flow channel P from the air in the storage chamber S does may flow into the clean flow channel P3 from the air flow channel P. The air in the storage chamber S, which is sucked into the air flow channel P, may be ejected through the air flow channel P and into the storage chamber S through the ejection hole 41.

A cleaning unit 66 (or cleaning device) may be disposed in or at the clean flow channel P3. The cleaning unit 66 may include a filter unit 67 (or filter device) disposed in the clean channel P3. The filter unit 67 may include a sterilization filter capable of sterilizing/removing bacteria in the air.

The cleaning unit 66 may include a cleaning fan 68. The cleaning fan 68 may suck air from the storage chamber S into the clean flow channel P3 and flow the air into the filter unit 67. The fan 68 may blow air passing through the filter unit 67 into the storage chamber S through the clean channel P3.

The filter unit 67 and the cleaning fan 68 may be mounted on the duct 4. In particular, the filter unit and the cleaning fan may be mounted on the clean flow channel body 61.

The air in the storage chamber S may pass through the air intake hole 43 and may then be sucked by the blowing fan 9, and then blown upward or downward from the blowing fan 9.

The blowing fan 9 may be disposed between the duct 4 and the storage chamber body 11. The duct 4 may have a protruding protrusion 44 forward from the top or bottom of the duct. The height of the protrusion 44 may be determined by the height of the blowing fan 9. Between the protrusion 44 and the storage chamber body 11, a receiving space P4 for accommodating the blowing fan 9 may be provided. Between the back surface of the protrusion 44 and the storage chamber body 11, a receiving space P4 capable of accommodating the blowing fan 9 may be formed. This space P4 may be made to have a volume larger than the volume of the blowing fan 9. The front-rear direction width of the space P4 may be larger than the front-rear direction width of the blowing fan 9.

The blowing fan 9 may be disposed between the lower portion of the duct 4 and the storage chamber body 11 so that the air in the storage chamber S may be sucked in the forward or backward direction or in the lateral direction, and the air may be blown upward. In this example, the protrusion 44 may be formed on the lower portion of the duct 4.

In another example the blowing fan 9 may disposed between the upper portion of the duct 4 and the storage chamber body 11, and the blowing fan 9 may suck air in the storage chamber S in the forward or backward direction or in the lateral direction, and blow air in the downward direction. In this example, the protrusion 44 may be formed on top of the duct 4.

The duct 4 may be in a plate shape. Alternatively, the duct 4 may be in a box shape.

When the duct 4 has a box shape, the duct 4 may also include a front cover 45, a left cover 46 protruding rearward from the left side of the front cover 45, and a right cover 47 protruding rearward from the right side of the front cover 45.

The left cover 46 and the right cover 47 may be spaced apart from each other in left and right directions Y. Between the left cover 46 and the right cover 47, the roll-bond evaporator 8 may be accommodated and the air flow channel P through which air can pass may be provided.

The duct 4 may be constructed as a single member. The duct may also consist of a combination of a plurality of members.

If the duct 4 comprises a combination of a plurality of members, the duct 4 may include the duct cover 5 and an insulating member 6.

The duct cover 5 may be configured as an outer duct configured to allow a front face of the duct cover 5 to be visible from the outside when the door 2 is open.

The duct cover 5 may include the front cover 45, the left cover 46, and the right cover 47.

The ejection hole 41 may be formed in the duct cover 5. The duct cover 5 may be provided with a clean intake hole 51 and a clean ejection hole 52 in communication with the clean flow channel P3.

The thermal insulating member 6 may be embodied as the inner duct shielded by the duct cover 5. The thermal insulation member 6 may be in contact with the inner surface of the duct cover 5 (i.e., the back surface of the front cover 45) so that the duct cover 5 does not freeze.

The clean flow channel body 61 may protrude rearward from the thermal insulating member 6.

An inner ejection hole 62 communicating with the ejection hole 41 may be provided in the thermal insulating member 6. The air passing through the air flow channel P may be ejected into the storage chamber S sequentially through the inner ejection hole 62 of the thermal insulation member 6 and the ejection hole 41 of the duct cover 5.

An inner clean ejection hole 63 may be provided in the thermal insulating member 6. The inner clean ejection hole 63 may communicate with the clean ejection hole 52 of the duct cover 5. Air in the clean flow channel P may pass through the hole 63.

The air in the clean flow channel P may sequentially pass through an inner clean ejection hole 63 and the clean ejection hole 52, and the air may then be ejected into the storage chamber S.

The roll-bond evaporator 8 may be described in detail.

The roll-bond evaporator 8 may be disposed within the storage chamber body 11. The refrigerant may be evaporated by the roll-bond evaporator 8.

The roll-bond evaporator 8 may be disposed in the storage chamber body 11 forming the refrigerating chamber to cool the refrigerating chamber.

The roll-bond evaporator 8 may be disposed in the air flow channel P. The air flow channel P may act as the roll-bond evaporator accommodation space to accommodate the roll-bond evaporator 8 therein. The air flowing from the blowing fan 9 into the air flow channel P may be heat exchanged with the roll-bond evaporator 8 while passing through the air flow channel P.

The roll-bond evaporator 8 may be connected (or coupled) to the expander via an inflow tube. The evaporator 8 may be connected to the compressor via an outflow tube. The refrigerant, inflated by the expander, may be in-flowed through the inflow tube to the roll-bond evaporator 8. The refrigerant may pass through the roll-bond evaporator 8 and absorb heat in the air flow channel P, thereby the refrigerant being evaporated. The refrigerant evaporated in the roll-bond evaporator 8 may flow into the outflow tube, and may be compressed into a high temperature and high pressured air by the compressor.

The roll-bond evaporator 8 may be constructed as follows. A pair of thermal transfer plates may be joined together and a refrigerant flow channel may be formed between the pair of thermal transfer plates. The roll-bond evaporator 8 may be implemented as a plate-type heat-exchanger in which the front and rear faces thereof are heat exchanged with air. The roll-bond evaporator 8 may be made thinner than the fin tube evaporator in which the fin is attached to the refrigerant tube.

In the refrigerator, the fin tube evaporator may not be disposed in the duct 4, but the roll-bond evaporator 8 may be disposed within the duct 4. In this example, the thickness of the air flow channel P (i.e., the width in the fore and aft direction of the channel P) and the width in the front and rear direction of the duct 4, can be reduced. Thus, the volume of the storage chamber S can be relatively increased.

The horizontal width of the roll-bond evaporator 8 may be smaller than the horizontal width of the duct 4.

The roll-bond evaporator 8 may extend vertically in an elongate manner between the duct 4 and the storage chamber body 11. The roll-bond evaporator 8 may be rectangular in overall shape. In the air flow channel P, the length of the evaporator 8 in the vertical direction may be longer than the length in the horizontal direction thereof.

The roll-bond evaporator 8 may have a width of the rear-front direction, that is, the thickness smaller than the length of the vertical direction and the length of the horizontal direction thereof, respectively.

The front face (or front surface) of the roll-bond evaporator 8 may face the back of the duct 4. The back surface (or back face) of the roll-bond evaporator 8 may face the front face of the storage chamber body 11.

Referring to FIG. 3, a horizontal direction width W1 of the roll-bond evaporator 8 may be smaller than a horizontal direction width W2 of the duct 4. The horizontal direction width W1 of the roll-bond evaporator 8 may be the maximum width of the horizontal direction width of the roll-bond evaporator 8. The horizontal direction width W2 of the duct 4 may be the maximum width of the horizontal direction width W2.

The roll-bond evaporator 8 may be arranged between the duct 4 and the storage chamber body 11 to achieve maximum contact area with air.

The single roll-bond evaporator 8 may be placed inside the duct 4. Alternatively, a plurality of evaporators 8A and 8B may be disposed inside the duct 4.

The refrigerator may also include a plurality of the roll-bond evaporators 8A and 8B. When the refrigerator includes the plurality of roll-bond evaporators 8A and 8B, the contact area between the evaporators and the air may be increased.

At least one of the plurality of roll-bond evaporators 8A and 8B may be provided with a cut portion 82 without overlapping the clean flow channel body 61.

The clean flow channel body 61 may be provided as a polygon having, for example, a rectangular outer edge. The cut portion 82 may be a polygon having the same shape as the clean flow channel body 61.

The clean flow channel body 61 may have a rectangular parallelepiped shape extending in the vertical direction Z. The cut portion 82 may define a rectangular opening elongated in the vertical direction Z.

The area of the opening defined in the cut portion 82 may be larger than the area of the clean flow channel body 61.

When the refrigerator includes plurality of roll-bond evaporators 8A and 8B, the refrigerator may also include the front roll-bond evaporator 8A and the rear roll-bond evaporator 8B.

The front roll-bond evaporator 8A may be spaced from the duct 4 in the rear-front direction X.

The rear roll-bond evaporator 8B may be spaced apart from the front roll-bond evaporator 8A and the storage chamber body 11, respectively, in the rear-front direction X.

The front roll-bond evaporator 8A and the rear roll-bond evaporator 8B may each be connected to an inflow tube 88 and an outflow tube 89 through which the refrigerant passes.

The front roll-bond evaporator 8A and the rear roll-bond evaporator 8B may be connected (or coupled) in series with the refrigerant flow channel. Alternatively, parallel connections between the front and rear roll-bond evaporators may be provided.

When the refrigerator contains multiple roll-bond evaporators 8, the refrigerator may include a middle roll-bond evaporator disposed between the front roll-bond evaporator 8A and the rear roll-bond evaporator 8B. The middle roll-bond evaporator may be spaced apart from the front roll-bond evaporator 8A and the rear roll-bond evaporator 8B, respectively. The middle roll-bond evaporator may be arranged in a plural manner between the front roll-bond evaporator 8A and the rear roll-bond evaporator 8B. In this example, the plurality of middle roll-bond evaporators may be spaced apart from each other in the rear-front direction. In this example, at least one middle-layer roll-bond evaporator may be connected in series or in parallel with at least one of the front roll-bond evaporator 8A and the rear roll-bond evaporator 8B.

In the refrigerator, the total number of the roll-bond evaporators spaced apart from one another in the rear-front direction X is not particularly limited. For example, the number of roll-bond evaporators may be a minimum of two and a maximum of five. Other numbers may also be used.

At least one of the plurality of roll-bond evaporators 8A 8B may have a cut portion 82 that does not overlap with the clean flow channel body 61. The sum of the areas of the roll-bond evaporator 8A 8B may be greater than the area of the duct 4.

The front roll-bond evaporator 8A may have a cut-off portion 82 that does not overlap with the clean flow channel body 61.

In this example, the front roll-bond evaporator 8A may include a left heat-exchange portion 83 located to the left side of the clean flow channel body 61, a right heat-exchange portion 84 located to the right side of the clean flow channel body 61, and a lower heat-exchange portion 85 connecting the lower end of the left heat-exchange portion 83 and the lower end of the right heat-exchange portion 84.

The cut portion 82 may be located between the left heat-exchange portion 83 and the right heat-exchange portion 84. A portion of the lower heat-exchange portion 85 may be located below the cut portion 82. The left heat-exchange portion 83 and the right heat-exchange portion 84 may sandwich the cut portion 82 therebetween and be spaced horizontally from each other.

The distance between the left heat-exchange portion 83 and the right heat-exchange portion 84 may be longer than the horizontal direction width of the clean flow channel body 61. The front roll-bond evaporator 8A may be disposed to surround the left, lower and right sides of the clean flow channel body 61.

The area of the front roll-bond evaporator 8A may be less than the area of the rear roll-bond evaporator 8B. The sum of the area of the front roll-bond evaporator 8A and the area of the rear roll-bond evaporator 8B may be larger than the area of the duct 4.

In at least one embodiment, the plurality of roll-bond evaporators 8A and 8B may have a heat transfer area as wide as possible without being interfered with the clean flow channel body 61. As described above, the cut portion 82 may be formed in the roll-bond evaporator 8A, which is closer to the duct 4 in the forward and backward directions X. In at least one embodiment, most preferably, the cut portion 82 may not be formed in the roll-bond evaporator 8B, which is relatively farther away from the duct 4 in the forward and backward directions X.

In this embodiment, the cut portion 82 may be provided in all of the plurality of the roll-bond evaporators 8A and 8B. Thus, embodiments are not limited to the configuration in which the cut portion 82 is provided in only some of a plurality of the roll-bond evaporators 8A 8B.

When the cut portion 82 is provided only in some of a plurality of the roll-bond evaporators 8A and 8B, the sum of the area of the clean flow channel body 61 and the area of the front roll-bond evaporator 8A may be smaller than the area of the rear heat-exchange portion 8B.

Between the clean flow channel body 61 and the front roll-bond evaporator 8A, a gap G4 may be provided, as shown in FIG. 2. The gap G4 may be directed to the front face of the rear roll-bond evaporator 8B.

That is, the rear roll-bond evaporator 8B may include the following regions: a first region facing the front roll-bond evaporator 8A in the front-rear direction X, a second region facing the clean flow channel body 61 in the front-rear direction X, and a third region facing the gap G4 between the clean flow channel body 61 and the front roll-bond evaporator 8A in the front-rear direction X. The third region may be located between the first region and the second region.

Even when the refrigerator has the clean flow channel P3 defined by the cut portion 82 as described above, the horizontal thickness of the duct 4 may be minimized. Thus, the volume of the storage chamber S may be maximized.

The blowing fan 9 may be described in detail.

The blowing fan 9 may blow air into the air flow channel P by sucking air in the storage chamber S.

The blowing fan 9 may include a fan motor 91 and a fan housing 93.

The fan motor 91 may be disposed at a position where the air can be blown evenly to the roll-bond evaporator 8 located higher or lower than the fan motor 91. The fan motor 91 may be located at the vertical center axis V of the duct 4, as shown in FIG. 3.

When the roll-bond evaporator 8 is divided into three regions including the left region, the center region, and the right region, the fan motor 91 may be disposed below the central region of the roll-bond evaporator 8 or above the central region of the roll-bond evaporator 8. In this example, the fan motor 91 may uniformly blow air into the wide regions including the left region, the central region and the right region of the roll-bond evaporator 8.

The fan motor 91 may be configured as a centrifugal fan that sucks air in a horizontal direction and then blows air in a centrifugal direction.

In the fan motor 91, the blower may rotate around the horizontal rotation axis. The blower may rotate clockwise or counterclockwise around the horizontal rotation axis.

The fan housing 93 may include the following elements: an air intake guide 94 used for sucking air, a fan flow channel body 95 surrounding a portion of the outer circumference of the fan motor 91, and an ejection guide 96 for guiding the ejection of air blown from the fan motor 91.

The air intake guide 94 may have an air intake hole 94A defined therein through which air in the storage chamber S is sucked into the inner space of the fan housing 93.

The fan housing 93 may have an air ejection hole 96A formed at an upper portion thereof.

The fan flow channel body 95 may include left and right guide portions 95A and 95B. The left and right guide portions 95A and 95B may extend away from each other toward the roll-bond evaporator 8.

The blowing fan 9 may be disposed lower than the roll-bond evaporator 8. The left and right guide portions 95A and 95B may be disposed closer to the bottom 8D among the top 8C and bottom 8D of the roll-bond evaporator 8.

The left and right guide portions 95A and 95B may extend away from each other in the horizontal direction Y toward the upper portion as shown in FIG. 3.

The ejection guide 96 may be disposed to be spaced, in the vertical direction Z, from the roll-bond evaporator 8 and below the roll-bond evaporator 8, as shown in FIG. 6. The top face of the ejection guide 96 may face the roll-bond evaporator 8.

The ejection guides 96 may be inclined with respect to the horizontal plane and the vertical plane, respectively.

The ejection guide 96 may be inclined in a direction close to the storage chamber body 11 toward the upward direction.

The top face of the ejection guide 96 may face the air flow channel P in the vertical direction Z.

The ejection guide 96 may be in contact with the inner face of the storage chamber body 11.

The blowing fan 9 may include a fan motor bracket 97 used for mounting the fan motor 91.

The refrigerator may include an electro-thermal heater. The electro-thermal heater may be disposed around the roll-bond evaporator 8 to heat the roll-bond evaporator 8 to remove the frost of the roll-bond evaporator 8. If the defrost operation condition is satisfied, the roll-bond evaporator 8 may be defrosted by turning on the electro-thermal heater.

When the electro-thermal heater is installed around the evaporator as described above, the width or thickness of the rear-front direction of the duct 4 may be thick due to the electro-thermal heater. Accordingly, in the example where the heater is installed, the volume of the storage chamber S becomes smaller than in the example where the electro-thermal heater is not installed.

Thus, it may be desirable that the refrigerator defrost the roll-bond evaporator 8 without an electro-thermal heater.

The refrigerator according to this embodiment may not include a separate electro-thermal heater to defrost the roll-bond evaporator 8. The roll-bond evaporator 8 may be defrosted using air in the storage chamber S.

The temperature of the storage chamber S may be relatively higher than that of the roll-bond evaporator 8.

While the compressor is stopped, and when air in the storage chamber S flows into the roll-bond evaporator 8, the roll-bond evaporator 8 may be gradually heated by the air flowing from the storage chamber S. The roll-bond evaporator 8 may be defrosted by flowing air in the storage chamber S.

The roll-bond evaporator 8 may have a smaller frost deposition amount than a fin tube evaporator. When blowing air through the storage chamber S into the roll-bond evaporator 8 without inflowing the cold refrigerant into the roll-bond evaporator 8, the roll-bond evaporator 8 may be heated by the air blown from the storage chamber S and thereby be defrosted.

The defrost approach in which the roll-bond evaporator 8 is not defrosted using an electro-thermal heater, and as described above, air in the storage chamber S is blown into the roll-bond evaporator 8 to defrost the roll-bond evaporator 8 may be referred to as "natural defrost" for convenience.

The refrigerator defrosting the roll-bond evaporator 8 using a natural defrost may consume less power, and may more minimize the thickness of the duct 4 than in the example of the refrigerator defrosting using an electro-thermal heater.

When the temperature of the roll-bond evaporator 8 reaches the defrost completion temperature during defrost of the roll-bond evaporator, the refrigerator may terminate the defrost operation, which is the natural defrost. The refrigerator may include the defrost sensor 10 sensing the temperature of the roll-bond evaporator 8.

The defrost sensor 10 may be described in detail.

The defrost sensor 10 may be mounted on the roll-bond evaporator 8 to sense the temperature of the roll-bond evaporator 8. The refrigerator may determine the defrost operation completion of the roll-bond evaporator 8 based on the temperature sensed by the defrost sensor 10.

The defrost sensor 10 may be disposed closer to a first end of the roll-bond evaporator 8 than a second end thereof in the air flow direction, wherein the first end is closer to the blowing fan 9 than the second end. The first end is opposite to the second end in the air flow direction. The defrost sensor 10 may be disposed closer to a third end of the roll-bond evaporator 8 than a fourth end thereof in a direction perpendicular to the air flow direction, wherein the third end is opposite to the fourth end in the air flow direction. When the air flow direction is a vertical direction, the defrost sensor 10 may be placed closer to either the left end or the right end of the roll-bond evaporator 8.

The defrost sensor 10 may be positioned closer to the bottom 8D, which is closer to the blowing fan 9, among the top 8C and bottom 8D of the roll-bond evaporator 8. The sensor may be positioned closer to the end 8F, among the left end 8E and the right end 8F of the roll-bond evaporator 8.

If the roll-bond evaporator 8 extends long in the vertical direction and the blowing fan 9 is placed lower than the roll-bond evaporator 8, the defrost sensor 10 may be closer to the bottom among the top and bottom of the roll-bond evaporator 8. The sensor may be disposed closer to either the left end or the right end of the roll-bond evaporator 8.

On the other hand, if the roll-bond evaporator 8 extends long in the vertical direction and the blowing fan 9 is positioned higher than the roll-bond evaporator 8, the defrost sensor 10 may be closer to the top among the top and bottom of the roll-bond evaporator 8. The sensor may be provided closer to either the left end or the right end of the roll-bond evaporator 8.

When the roll-bond evaporator 8 is extended in the horizontal direction and the blowing fan 9 is disposed to the right side of the roll-bond evaporator 8, the defrost sensor 10 may be closer to the right end among the left end and the right end of the roll-bond evaporator 8, and the sensor may be disposed closer to either the top or the bottom of the roll-bond evaporator 8.

On the other hand, when the roll-bond evaporator 8 is extended in the horizontal direction and the blowing fan 9 is disposed to the left side of the roll-bond evaporator 8, the defrost sensor 10 may be closer to the left end among the left end and the right end of the roll-bond evaporator 8, and the sensor may be disposed closer to either the top or the bottom of the roll-bond evaporator 8.

The location of the defrost sensor 10 may be described in detail.

The roll-bond evaporator 8 may be divided into a total of four regions including the left upper region, the left lower region, the right upper region, and the right lower region. In this example, if the blowing fan 9 is provided lower than the roll-bond evaporator 8, the defrost sensor 10 may be mounted on any one of the left lower region and the right lower region of the four regions.

When the roll-bond evaporator 8 is divided into four regions as described above, and the blowing fan 9 is positioned higher than the roll-bond evaporator 8, the defrost sensor 10 may be mounted on any one of the left upper region and the right upper region of the four regions.

In another example, the roll-bond evaporator 8 may include a total of nine regions of a left upper region, a left middle region and a left lower region, a middle upper region, a central region and a middle lower region, a right upper region and a right middle region and a right lower region. In this example, if the blowing fan 9 is provided lower than the roll-bond evaporator 8, the defrost sensor 10 may be mounted on either the left lower region or the lower right region of the nine regions.

When the roll-bond evaporator 8 is divided into nine regions as described above and when the blowing fan 9 is positioned higher than the roll-bond evaporator 8, the defrost sensor 10 may be mounted on either the left upper region or the right upper region of the nine regions.

As another example, when the roll-bond evaporator 8 is divided into four regions in each of the horizontal and vertical directions, the roll-bond evaporator 8 may be divided into a total of sixteen regions. In this example, the defrost sensor 10 may be mounted on one region of the following region: the left bottom region, which is located at the bottom of the leftmost regions, a left top region located at the uppermost one of the leftmost regions, a right bottom region located at the bottom of the rightmost regions and the right top region located at of the topmost region of the rightmost regions.

The defrost sensor 10 may be mounted on a region close to the blowing fan 9, among the left bottom region, the left top region, the right bottom region, and the right top region. If the blowing fan 9 is provided lower than the roll-bond evaporator 8, the defrost sensor 10 may be mounted on one of the left bottom region and the right bottom region.

When the blowing fan 9 is provided higher than the roll-bond evaporator 8, the sensor may be mounted on one of the left top region, and the right top region.

A specific region is closer to the end 8D closer to the blowing fan 9 among the top 8C and bottom 8D of the roll-bond evaporator 8. This specific region is closer to the right end 8F among the left end 8E of the roll-bond evaporator 8 and the right end 8F end thereof. In this specific region, the temperature may be low and the relative air volume may be smaller than in the other regions. In this specific region, the temperature rise due to the natural defrost of the roll-bond evaporator 8 may be most retarded. The defrost sensor 10 may be disposed on this specific region where the temperature may be low and the relative air volume may be smaller than in the other regions, and the temperature rise due to the natural defrost of the roll-bond evaporator 8 is most retarded. This may prevent the defrost operation from being completed with the roll-bond evaporator 8 not being fully defrosted.

The defrost sensor 10 may be closer to either the left and right guide portions 95A and 95B.

The defrost sensor 10 may be located at a location other than the vertical center axis V of the duct 4.

On the roll-bond evaporator 8, the region closer to the vertical center axis V of the duct 4 may be the region to which the air blown from the blowing fan 9 is mainly blown.

On the roll-bond evaporator 8, the region remote from the vertical center axis V may be a region toward which air blown from the blowing fan 9 is largely unreachable. The defrost sensor 10 may be preferably installed on the region on which air blown from the blowing fan 9 is not concentrated. The sensor may be preferably located outside the vertical center axis V of the duct 4.

The defrost sensor 10 may be disposed on the front roll-bond evaporator 8A and the rear roll-bond evaporator 8B. The defrost sensor 10 may be mounted on one of the front roll-bond evaporator 8A and the rear roll-bond evaporator 8B.

Each of the front roll-bond evaporator 8A and the rear roll-bond evaporator 8B has an inflow tube 88 disposed on one region of the bottom left region and the bottom right region. The front roll-bond evaporator 8A and the rear roll-bond evaporator 8B each has an outflow tube 89 disposed on the other region of the bottom left and bottom right regions.

The defrost sensor 10 may be disposed in a region closer to the blowing fan 9, and at the same time, closer to either the left end 8E and the right end 8F of the front roll-bond evaporator 8A, among the top 8C and bottom 8D of the front roll-bond evaporator 8A.

The defrost sensor 10 may be disposed on the outflow tube 89 of the front roll-bond evaporator 8A or the inflow tube 88 of the front roll-bond evaporator 8A. Additionally, the defrost sensor 10 may be located in a region close to the inflow tube 88, or in a region close to the outflow tube 89 on the front roll-bond evaporator 8A.

When the blowing fan 9 is positioned below the front roll-bond evaporator 8A and blows air toward the front roll-bond evaporator 8A, among the bottom left region, the bottom middle region and the bottom right region of the front roll-bond evaporator 8A, each of the amount of air flow in the bottom left region and the amount of air flow in the bottom right region may be smaller than the amount of air flow in the bottom middle region. Therefore, in the former regions, the defrost may be delayed. Accordingly, it may be desirable that the defrost sensor 10 be disposed closer to the regions where the amount of air flow is small and the defrost is delayed.

When the duct 4 and the roll-bond evaporator 8 and the blowing fan 9 and the defrost sensor 10 are disposed in the storage chamber body 11 forming the refrigerating chamber, the storage chamber body 12 having the freezing chamber among the plurality of storage chamber bodies 11 and 12 may include the following additional components: the freezing chamber duct, the freezing chamber evaporator, the freezing chamber fan 101 and the freezing chamber defrost sensor 109.

The freezing chamber evaporator may be disposed in the storage chamber body 12 forming the freezing chamber.

The freezing chamber fan 101 may circulate air in the freezing chamber toward the freezing chamber evaporator and the freezing chamber.

The freezing chamber defrost sensor 109 may be disposed on the freezing chamber evaporator, and the freezing chamber defrost sensor may sense the temperature of the freezing chamber evaporator.

The refrigerator may include the compressor 100 for compressing the refrigerant, and the condenser for condensing the refrigerant compressed from the compressor 100.

The refrigerator may include a condenser fan 102 for blowing outside air to the condenser.

The refrigerator may include a refrigerant adjustment valve 103 (or refrigerant condenser valve) capable of distributing the refrigerant condensed in the condenser to the roll-bond evaporator 8 and the freezing chamber evaporator.

If the refrigerator includes both the roll-bond evaporator 8 and the freezing chamber evaporator, the refrigerant adjustment valve 103 may concentrate the refrigerant on either the roll-bond evaporator 8 or the freezing chamber evaporator. Alternatively, the valve may dispense the refrigerant toward both of the roll-bond evaporator 8 and the freezing chamber evaporator.

The refrigerator may include an expander, such as an electronic expansion valve or capillary tube, etc., which expands the refrigerant condensed from the condenser.

Between the refrigerant adjustment valve 103 and the roll-bond evaporator 8, a first expander, such as an electronic expansion valve or capillary tube, etc., may be placed to inflate the refrigerant flowing toward the roll-bond evaporator 8.

Between the refrigerant adjustment valve 103 and the freezing chamber evaporator, a second expander, such as an electronic expansion valve or capillary tube, etc., may be disposed to expand the refrigerant flowing toward the freezing chamber evaporator.

The refrigerator may include a storage chamber temperature sensor 106 that senses the temperature of the refrigerating chamber. The storage chamber temperature sensor may be in addition to the defrost sensor 10.

The refrigerator may include a freezing chamber temperature sensor 108 for sensing the temperature of the freezing chamber.

The refrigerator may be controlled based on the sensed temperatures from the defrost sensor 10, the storage chamber temperature sensor 106, the freezing chamber temperature sensor 108, and the freezing chamber defrost sensor 109, respectively. The refrigerator may include a controller 110, which controls the compressor 100 and the blowing fan 9. The controller 110 may also control the freezing chamber fan 101, the condenser fan 102 and the refrigerant adjustment valve 103.

The defrost sensor 10 may sense the temperature of the roll-bond evaporator 8 and output the sensed temperature to the controller 110.

The storage chamber temperature sensor 106 may sense the temperature of the storage chamber and output the sensed temperature to the controller 110.

The freezing chamber temperature sensor 108 may sense the temperature of the freezing storage chamber and output the sensed temperature to the controller 110.

The freezing chamber defrost sensor 109 may detect the temperature of the freezing chamber evaporator and output the sensed temperature to the controller 110.

The controller 110 may also control the blowing fan 9, the compressor 100, the freezing chamber fan 101, the condenser fan 102 and the refrigerant adjustment valve 103 based on the freezing chamber temperature or the refrigerating chamber temperature.

Figure 8:
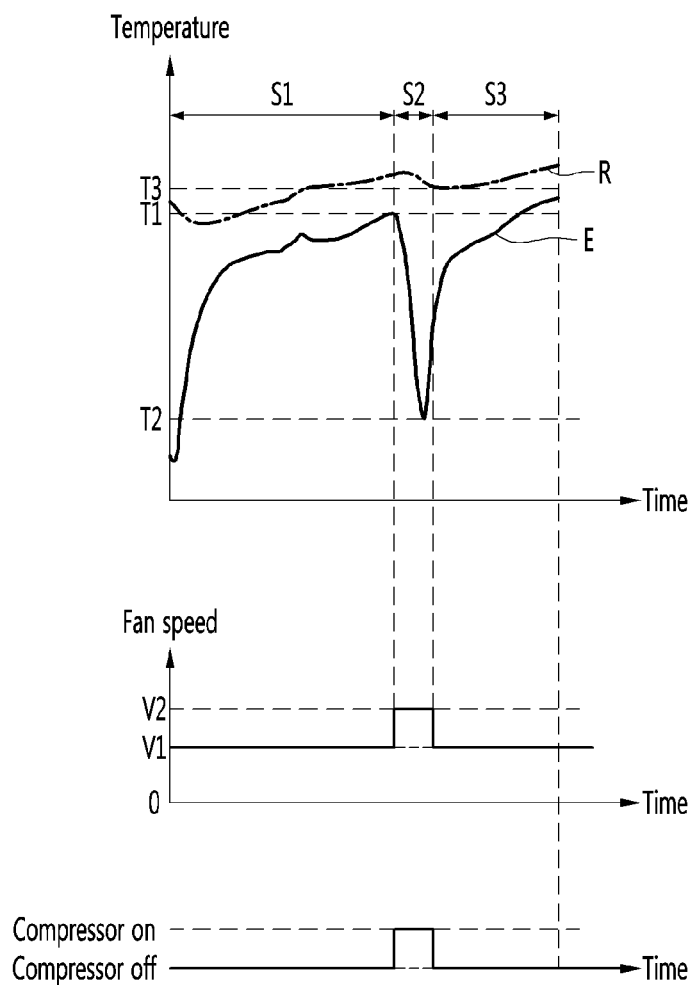
FIG. 8 shows on/off of a compressor, a speed of a blowing fan, a change of a storage chamber temperature, and a temperature change of a roll-bond evaporator during defrost operation in a refrigerator according to one embodiment of the present disclosure.

FIG. 8 shows on/off of the compressor, speed of the blowing fan, change of the storage chamber temperature, and temperature change of the roll-bond evaporator during defrost operation in the refrigerator according to one embodiment of the present disclosure. Other embodiments and configurations may also be provided.

Reference E in FIG. 8 represents the temperature change of the roll-bond evaporator 9. Reference R in FIG. 8 shows the temperature change of the storage chamber S cooled by the roll-bond evaporator 8.

The controller 110 may defrost the roll-bond evaporator 8 in multiple stages during defrost operation.

If the defrost operation start condition is satisfied, defrost operation may be performed by the refrigerator.

An example of a defrost operation start condition is as follows: when the compressor-driven integration time, which is the sum of the times when the compressor 100 is driven, reaches the preset start time of the defrost operation. When the compressor driven integration time reaches the defrost operation start preset time, the controller 110 stops the operation of the compressor based on the freezing chamber temperature or the refrigerating chamber temperature, and then initiates a defrost operation defrosting at least one of the roll-bond evaporator 8 and the freezing chamber evaporator.

Another example of a defrost operation start condition is as follows: when the frost deposition amount of the roll-bond evaporator 8, or the frost deposition amount of the freezing chamber evaporator, as measured by an infrared sensor is above the threshold.

Another example of a defrost operation start condition is as follows: the defrost operation start condition may be determined by comprehensively applying factors such as the compressor driven integration time, the temperature of the roll-bond evaporator 8, and the temperature of the freezing chamber evaporator.

More specifically, if the compressor driven integration time has reached the time set for the defrost operation start, and if the temperature of the freezing chamber evaporator is below the set temperature for initiating the defrost operation, the defrost operation may be initiated.

Additionally, if the compressor driven integration time was reached at the time set for the start of the defrost operation, and if the temperature of the roll-bond evaporator 8 is below the set temperature for the start of the defrost operation, the defrost operation may be initiated.

That is, if the defrost operation start condition is satisfied, the refrigerator may operate in defrost operation mode. In the defrost operation mode, the roll-bond evaporator 8 may be defrosted.

The controller 110 may be capable of defrosting both the freezing chamber evaporator and the roll-bond evaporator 8 during defrost operation. The controller 110 may defrost the freezing chamber evaporator first when the defrost operation start condition is satisfied, and then during the defrosting of the freezing chamber evaporator, the controller may initiate the defrost for the roll-bond evaporator 8. Conversely, the controller 110 may also defrost the freezing chamber evaporator and the roll-bond evaporator 8 simultaneously if the defrost operation start condition is met.

In the defrost operation mode, the controller 110 may turn off the compressor 100. In the off mode of the compressor 100, the controller 110 may initiate the defrost of the roll-bond evaporator 8 by driving the blowing fan 9 with the compressor 100 being off, in order to defrost the roll-bond evaporator 8.

The controller 110 may defrost the roll-bond evaporator 8 in multiple stages during defrosting of the roll-bond evaporator 8.

In this connection, the multistage defrost of the roll-bond evaporator 8 may mean defrosting the roll-bond evaporator 8 multiple times as the time elapses.

The controller 110 may cool (S2) the roll-bond evaporator 8 during a multi-steps defrost (S1 and S3) of the roll-bond evaporator 8.

The controller 110 may first defrost (S1) the roll-bond evaporator 8 and then cool the roll-bond evaporator 8 (S2) after the first defrost is stopped. After the cooling (S2) of the roll-bond evaporator 8 is stopped, the roll-bond evaporator 8 may be second defrosted (S3).

That is, the first defrost S1, the cooling S2, and the second defrost S3 for the roll-bond evaporator 8 may be sequentially performed, so that the evaporator may be uniformly defrosted as a whole.

The controller may perform the following modes (or steps) sequentially: the first defrost mode S1 in which the compressor 100 is in the off mode and the blowing fan 9 is rotated; the storage chamber cooling mode S2 in which the compressor 100 is on and the blowing fan 9 is rotating; and the second defrost mode S3 where the compressor 100 is off and the blowing fan 9 is rotating.

The first defrost may be initiated at the beginning of the defrost operation. Alternatively, when the defrost operation is initiated and the defrost of the freezing chamber proceeds, the first defrost commences. In this example, the first defrost may be started when a predetermined time elapses after the defrost operation is started.

The controller 110 may rotate the blowing fan 9 until the temperature sensed from the defrost sensor 10 reaches the first defrost termination temperature T1 for the time of first defrost.

In the first defrost mode, only the compressor 100 among the compressor 100 and the blowing fan 9 may be in an off mode while only the blowing fan 9 is driven.

In the first defrost, since the compressor 100 is off, the temperature E of the roll-bond evaporator 8 may be raised by the air flowing from the storage chamber S. Thus, the roll-bond evaporator 8 may be gradually defrosted.

If the blowing fan 9 continues to rotate with the compressor 100 off, the temperature E of the roll-bond evaporator 8 may reach the end temperature T1 of the first defrost. The controller 110 may complete the first defrost if the temperature E of the roll-bond evaporator 8 reaches the first defrost termination temperature T1.

The first defrost termination temperature T1 may be set lower than the second termination temperature T3, which may be described later.

The first defrost termination temperature T1 may be the reference temperature used to temporarily determine the defrost termination of the roll-bond evaporator 8 during the defrost of the roll-bond evaporator 8. The second defrost termination temperature T3 may be the temperature used to finally determine the defrost termination of the roll-bond evaporator 8. The termination temperature T1 of the first defrost S1 may be set to be lower by 1 to 4° C. than the termination temperature T3 of the second defrost S3. For example, if the ending temperature T3 of the second defrost S3 is 5° C., the termination temperature T1 of first defrost S1 may be a temperature set to be 1° C. to 4° C.

When the temperature E of the roll-bond evaporator 8 reaches the end temperature T1 of the first defrost, the controller 110 may complete the first defrost and initiate the storage chamber cooling S2.

The controller 100 may change the compressor 100 from the off state to the on state for the storage chamber cooling S2. A cold refrigerant may be inflowed into the roll-bond evaporator 8.

The controller 100 may continue to rotate the blowing fan 9, which was operated for the first defrost S1. When the compressor 100 is driven, and the blowing fan 9 rotates, the temperature of the roll-bond evaporator 8 may be lowered. Thus, the storage chamber temperature R, which was being raised by the first defrost S1, may be lowered due to the air cooled by the roll-bond evaporator 8.

The controller 110 may control the blowing fan 9 such that, at the storage chamber cooling S2, the blowing fan rotation speed V1 is different from the blowing fan rotation speed V2 of the first defrost S1, the blowing fan rotation speed V2 of the second defrost S3.

The controller 110 may control the blowing fan 9 such that, at the storage chamber cooling S2, the blowing fan rotation speed V1 is higher than the blowing fan rotation speed V2 of the first defrost S1, the blowing fan rotation speed V2 of the second defrost S3.

When the blowing fan 9 in the first cooling at S2 is rotated faster in the first defrost or second defrost, the air cooled by the roll-bond evaporator 8 can be quickly blown into the storage chamber S. Thus, the storage chamber S may quickly lower the temperature that was raised by the first defrost.

If, during the storage chamber cooling S2, the start condition of the second defrost is satisfied, the controller 110 may stop the storage chamber cooling S2 and initiate the second defrost.

In this connection, the initiation condition of the second defrost may correspond to the termination condition of the storage chamber cooling. The initiation condition may include various examples as follows.

For example, if the temperature of the roll-bond evaporator 8 is lowered to the second defrost initiation temperature T2 by the storage chamber cooling S2, the controller 110 may interrupt the storage chamber cooling and initiate the second defrost. In this example, the second defrost initiation temperature T2 may be a temperature set lower than the first defrost termination temperature T1 and the second defrost termination temperature T3. The second defrost initiation temperature T2 may be set to a subzero temperature. The second defrost initiation temperature T2 may be a temperature that is set to be lower by 10 to 15° C. than the first defrost termination temperature T1.

As another example, if the temperature of the freezing chamber evaporator or the freezing chamber reaches the initiation temperature of the second defrost, the controller 110 can interrupt the storage chamber cooling and initiate a second defrost. When in the storage chamber cooling (S2), the compressor 100 is driven, the defrost of the freezing chamber evaporator may be interrupted and cooling of the freezing chamber evaporator may commence. If the temperature of the freezing chamber evaporator or the freezing chamber rises to the initiation temperature of the second defrost, the controller 110 may interrupt the storage chamber cooling S2 and initiate a second defrost to prevent the temperature of the freezing chamber evaporator or the temperature of the freezing chamber from rising excessively. In this example, the second defrost initiation temperature may be set at room temperature.

If the initiation condition of the second defrost is satisfied, the controller 110 may stop the compressor 100, which was being operated during the storage chamber cooling S2, and the controller may continue to maintain rotation of the blowing fan 9 that has rotated during the storage chamber cooling S2.

Until the temperature sensed from the defrost sensor 10 at the time of the second defrost reaches a second defrost termination temperature T3 higher than the termination temperature T1 of the first defrost, the controller 110 may continue to rotate the blowing fan 9.

The controller 110 may rotate the blowing fan 9 at a lower speed during the second defrost than during the storage chamber cooling S2. The controller 110 may lower the rotation speed of the blowing fan 9 to a smaller degree during the initiation of the second defrost than the rotation speed for the storage chamber cooling S2.

At the stop of the compressor 100 according to the second defrost, the air in the storage chamber S can flow into the roll-bond evaporator 8. The temperature E of the roll-bond evaporator 8 may be increased. The temperature R of the storage chamber S may also gradually increase.

The defrost sensor 10 may sense the temperature E of the roll-bond evaporator 8 during the second defrost and output the sensed temperature to the controller 110. When the temperature E of the roll-bond evaporator 8 reaches the termination temperature T3 of the second defrost, the controller 110 may determine that the roll-bond evaporator 8 is sufficiently defrosted.

When the temperature E of the roll-bond evaporator 8 reaches the termination temperature T3 of the second defrost, the controller 110 may stop the rotating blowing fan 9. The controller may terminate the defrost of the roll-bond evaporator 8.

The refrigerator may defrost the roll-bond evaporator 8 more reliably by performing the defrost twice via the above control. By cooling the storage chamber S between two defrosts, the temperature of the storage chamber S may be prevented from rising sharply during the defrost of the roll-bond evaporator 8. In other words, the refrigerator can reliably defrost the roll-bond evaporator 8 while minimizing the decay and change of food in the storage chamber S.

Figure 9:
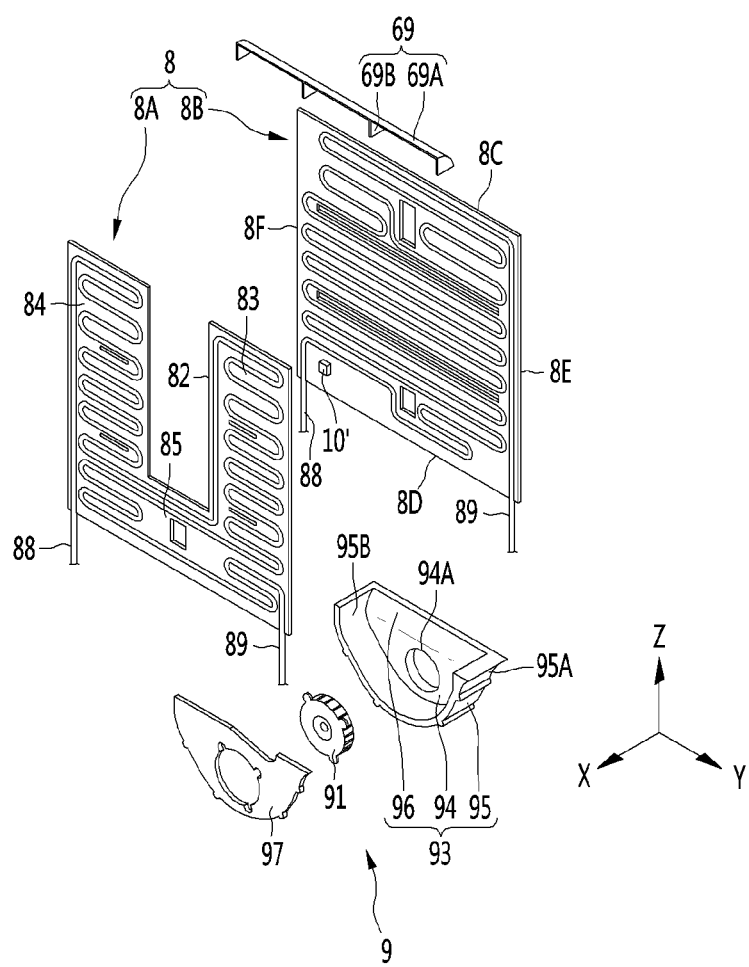
FIG. 9 is an exploded perspective view of a roll-bond evaporator and a blowing fan of a refrigerator according to another embodiment of the present disclosure.
Figure 10:
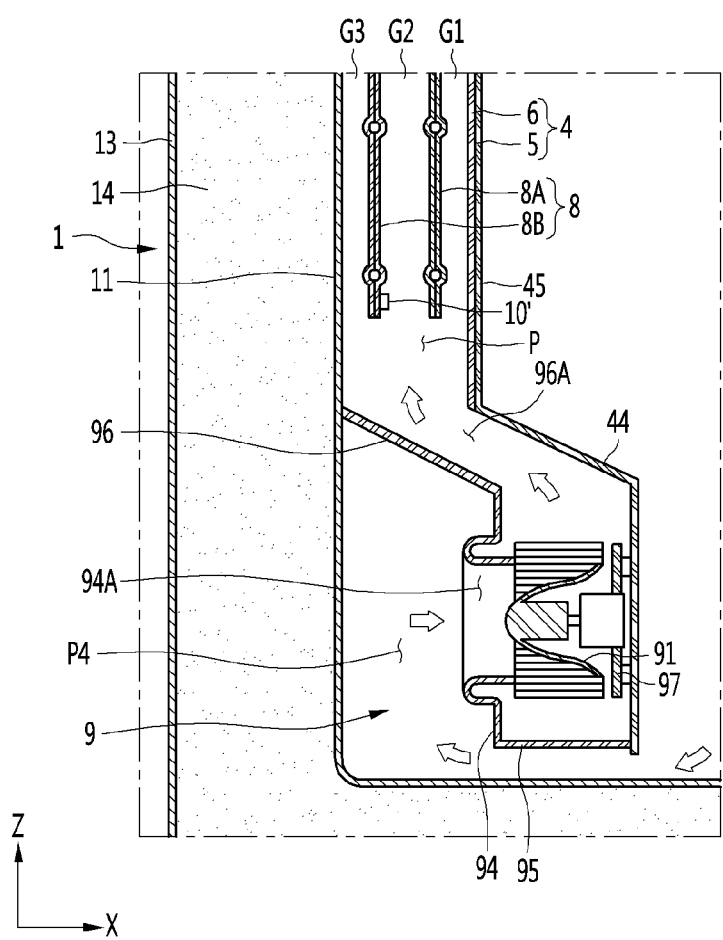
FIG. 10 is a vertical cross-sectional view of a duct, a roll-bond evaporator and a blowing fan of a refrigerator according to embodiment of the present disclosure.

FIG. 9 is an exploded perspective view of the roll-bond evaporator and the blowing fan of the refrigerator according to embodiment of the present disclosure. FIG. 10 is a vertical cross-sectional view of the duct, the roll-bond evaporator and the blowing fan of the refrigerator according to embodiment of the present disclosure. Other embodiments and configurations may also be provided.

The defrost sensor 10' of the present embodiment may be disposed on the front face of the rear roll-bond evaporator 8B. In this example, the thickness of the defrost sensor 10' may be smaller than a gap G2 between the front roll-bond evaporator 8A and the rear roll-bond evaporator 8B.

The defrost sensor 10' may be spaced apart from the backside of the front roll-bond evaporator 8A. The sensor 10' may be in contact with the front face of the rear roll-bond evaporator 8B.

In this example, the defrost sensor 10' may located in one among the top 8C and bottom 8D of the rear roll-bond evaporator 8B, which is closer to the blowing fan 9, and at the same time, is closer to the left end 8E or the right end 8F of the rear roll-bond evaporator 8B.

When the blowing fan 9 is disposed lower than the rear roll-bond evaporator 8B and the fan blows air in the upward direction, the defrost sensor 10' may be located closer to the bottom 8D of the rear roll-bond evaporator 8B, and closer to either the left end 8E and the right end 8F of the rear roll-bond evaporator 8B. That is, the blowing fan 9 may be provided closer to either the bottom left or the bottom right of the rear roll-bond evaporator 8B.

Other configurations and operations in this embodiment, other than the location of the defrost sensor 10' may be identical or similar to those in the above-described embodiments of the present disclosure. Therefore, a detailed description thereof may be omitted.

The present disclosure is not limited to the above embodiments. The configuration in which the defrost sensor 10 is disposed on each of the front roll-bond evaporator 8A and the rear roll-bond evaporator 8B may also be included in embodiments. The controller 110 may determine the defrost completion of the roll-bond evaporator 8, using at least one of the temperature sensed by the defrost sensor disposed on the front roll-bond evaporator 8A and the temperature sensed by the defrost sensor disposed on the rear roll-bond evaporator 8B. In this example, the controller may determine termination of the first defrost S1 or termination of the second defrost S3 based on a lower temperature among the temperature sensed by the defrost sensor disposed on the front roll-bond evaporator 8A and the temperature sensed by the defrost sensor disposed on the rear roll-bond evaporator 8B. That is, when the lower temperature among the temperature sensed by the defrost sensor disposed on the front roll-bond evaporator 8A and the temperature sensed by the defrost sensor disposed on the rear roll-bond evaporator 8B is the first defrost termination temperature, the controller may terminate the first defrost. Alternatively, when the lower temperature among the temperature sensed by the defrost sensor disposed on the front roll-bond evaporator 8A and the temperature sensed by the defrost sensor disposed on the rear roll-bond evaporator 8B is the second defrost termination temperature, the controller may terminate the second defrost.

The present disclosure may provide a refrigerator capable of evenly defrosting the entire roll-bond evaporator.

In a first aspect of the present disclosure, there is provided a refrigerator comprising: a duct arranged to partition an inner space of a storage chamber body into a storage chamber and an air flow channel, wherein the duct has an ejection hole defined therein; a roll-bond evaporator disposed in the air flow channel, wherein the roll-bond evaporator has a top and a bottom, a left end and a right end; a blowing fan configured to draw air from the storage chamber to blow the air into the air flow channel; and a defrost sensor closer to one of the top and bottom than the other of the top and the bottom, wherein said one is closer to the blowing fan than the other, wherein the sensor is closer to one of the left end and the right end than the other of the left end and the right end.

In one embodiment of the first aspect, the blowing fan includes a fan motor and a fan housing receiving the fan mother, wherein the fan housing includes: an air intake guide configured for sucking air; a fan flow channel body surrounding a portion of an outer circumference of the fan motor; and an ejection guide configured for guiding ejection of air blown from the fan motor, wherein the fan flow channel body includes left and right guide portions, wherein the left and right guide portions extend away from each other toward the roll-bond evaporator, wherein the defrost sensor is closer to one of the left and right guide portions than the other thereof.

In one embodiment of the first aspect, the fan motor is located at a vertical center axis of the duct, wherein the defrost sensor is located outside the vertical center axis.

In one embodiment of the first aspect, the roll-bond evaporator includes: a front roll-bond evaporator spaced apart from the duct in a rear-front direction of the refrigerator; and a rear roll-bond evaporator spaced apart from the front roll-bond evaporator and the storage chamber body in the rear-front direction.

In one embodiment of the first aspect, the defrost sensor is disposed on the front roll-bond evaporator or the rear roll-bond evaporator.

In one embodiment of the first aspect, each of the front roll-bond evaporator and the rear roll-bond evaporator includes: an inflow tube fluid-connected thereto at one of a bottom left position and bottom right position of the corresponding roll-bond evaporator; and an outflow tube fluid-connected thereto at the other of the bottom left position and bottom right position of the corresponding roll-bond evaporator.

In one embodiment of the first aspect, the defrost sensor is disposed on the outflow tube of the front roll-bond evaporator or on the inflow tube of the front roll-bond evaporator.

In one embodiment of the first aspect, the defrost sensor is disposed on a front face of the rear roll-bond evaporator.

In one embodiment of the first aspect, a thickness of the defrost sensor is smaller than a gap between the front roll-bond evaporator and the rear roll-bond evaporator.

In one embodiment of the first aspect, the refrigerator further comprises a controller, wherein the controller is configured to perform sequentially a first defrost mode, a storage chamber cooling mode, and a second defrost mode, wherein the first defrost mode, a compressor is in an off state and the blowing fan rotates, wherein in the storage chamber cooling mode, the compressor is an on state, and the blowing fan rotates, wherein in the second defrost mode, the compressor is in an off state and the blowing fan rotates.

In one embodiment of the first aspect, the controller is configured to control the blowing fan such that a blowing fan rotation speed for the storage chamber cooling mode is higher than a blowing fan rotation speed for the first defrost mode.

In one embodiment of the first aspect, the controller is configured to control the blowing fan such that a blowing fan rotation speed for the storage chamber cooling mode is higher than a blowing fan rotation speed for the second defrost mode.

In one embodiment of the first aspect, a termination temperature of the first defrost mode is lower than a termination temperature of the second defrost mode.

In one embodiment of the first aspect, the termination temperature of the first defrost mode is lower than the termination temperature of the second defrost mode by 1° C. to 4° C.

In one embodiment of the first aspect, the controller is configured to rotate the blowing fan until a temperature sensed by the defrost sensor in the first defrost mode reaches a termination temperature of the first defrost mode, wherein the controller is configured to keep rotating the fan until a temperature sensed by the defrost sensor in the second defrost mode reaches a termination temperature of the second defrost mode, wherein the termination temperature of the second defrost mode is higher than the termination temperature of the first defrost mode.

In a first aspect of the present disclosure, there is provided a refrigerator comprising: a duct arranged to partition an inner space of a storage chamber body into a storage chamber and an air flow channel, wherein the duct has an ejection hole defined therein; a roll-bond evaporator disposed in the air flow channel, wherein the roll-bond evaporator has a top and a bottom, a left end and a right end; a compressor configured to compress refrigerant flowed from the evaporator; a blowing fan configured to draw air from the storage chamber to blow the air into the air flow channel; a defrost sensor closer to one of the top and bottom than the other of the top and the bottom, wherein said one is closer to the blowing fan than the other, wherein the sensor is closer to one of the left end and the right end than the other of the left end and the right end; and a controller, wherein the controller is configured to perform sequentially a first defrost mode, a storage chamber cooling mode, and a second defrost mode, wherein the first defrost mode, the compressor is in an off state and the blowing fan rotates, wherein in the storage chamber cooling mode, the compressor is an on state, and the blowing fan rotates, wherein in the second defrost mode, the compressor is in an off state and the blowing fan rotates, wherein the roll-bond evaporator includes: a front roll-bond evaporator spaced apart from the duct in a rear-front direction of the refrigerator; and a rear roll-bond evaporator spaced apart from the front roll-bond evaporator and the storage chamber body in the rear-front direction, wherein the defrost sensor is disposed on the front roll-bond evaporator and/or the rear roll-bond evaporator.

In one embodiment of the second aspect, the blowing fan includes a fan motor and a fan housing receiving the fan mother, wherein the fan housing includes: an air intake guide configured for sucking air; a fan flow channel body surrounding a portion of an outer circumference of the fan motor; and an ejection guide configured for guiding ejection of air blown from the fan motor, wherein the fan flow channel body includes left and right guide portions, wherein the left and right guide portions extend away from each other toward the roll-bond evaporator, wherein each of the left and right guide portions is closer to the bottom of the roll-bond evaporator than to the top thereof, wherein the defrost sensor is closer to the bottom of the roll-bond evaporator than to the top thereof, wherein the sensor is closer to one of the left and right guide portions than to the other thereof.

In one embodiment of the second aspect, the controller is configured to control the blowing fan such that a blowing fan rotation speed for the storage chamber cooling mode is higher than a blowing fan rotation speed for the second defrost mode.

In one embodiment of the second aspect, a termination temperature of the first defrost mode is lower than a termination temperature of the second defrost mode.

In one embodiment of the second aspect, the termination temperature of the first defrost mode is lower than the termination temperature of the second defrost mode by 1° C. to 4° C.

In one embodiment of the second aspect, the controller is configured to rotate the blowing fan until a temperature sensed by the defrost sensor in the first defrost mode reaches a termination temperature of the first defrost mode, wherein the controller is configured to keep rotating the fan until a temperature sensed by the defrost sensor in the second defrost mode reaches a termination temperature of the second defrost mode, wherein the termination temperature of the second defrost mode is higher than the termination temperature of the first defrost mode.

According to the present disclosure, the refrigerator may determine the termination of the defrost operation based on the temperature of the region with relatively slow defrost on the roll-bond evaporator. This may allow the defrost operation to be completed after defrosting the entire roll-bond evaporator. Thereby, reliability of the defrost operation may be advantageously high.

Further, air may contact the front face and rear face of the front roll-bond evaporator and the front face and rear face of the rear roll-bond evaporator, respectively. This may allow air to be cooled with a wider contact area than when the single roll-bond evaporator is placed in the air flow channel. This may have the advantage that the storage chamber can be cooled more quickly.

Additionally, the defrost sensor may be installed at the optimum position on either the front roll-bond evaporator or the rear roll-bond evaporator. This may have the advantage of the refrigerator being able to accurately detect the defrost completion time of the roll-bond evaporator with the minimum number of defrost sensors.

Additionally, the refrigerator may cool the storage chamber between the first defrost and the second defrost of the roll-bond evaporator. This may prevent the temperature of the storage chamber from rising sharply during the defrost of the roll-bond evaporator.

This may inhibit corruption and degradation of the food in the storage chamber during the defrost operation.

Further, for the storage chamber cooling, the blowing fan may rotate faster than for the first defrost or second defrost. As a result, the temperature of the storage chamber, which has warmed up in the first defrost, may be quickly lowered. This can shorten the time of the storage chamber cooling between first defrost and second defrost. This may shorten the time of the entire defrost process, including the first defrost, the storage chamber cooling, and the second defrost.

The above description is merely illustrative of the technical idea of the present disclosure. Those skilled in the art will recognize that various modifications and changes may be made without departing from the essential characteristics of the present disclosure.

Accordingly, the embodiments disclosed in the present disclosure are intended to illustrate, not to limit, the technical idea of the present disclosure. Such an embodiment does not limit the scope of the technical idea of the present disclosure. The scope of protection of the present disclosure is to be construed in accordance with the following claims. All technical ideas which are within the scope of the claims are to be construed as being included in the scope of the present disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A refrigerator comprising:
  a duct arranged to separate a storage chamber body into a storage chamber and an air flow channel, wherein the duct includes an ejection hole;
  a roll-bond evaporator disposed in the air flow channel, wherein the roll-bond evaporator has a top, a bottom, a left end and a right end;
  an inflow tube fluidly connected to the roll-bond evaporator and in which refrigerant being introduced into the roll-bond evaporator flows;
  an outflow tube fluidly connected to the roll-bond evaporator and in which the refrigerant discharged from the roll-bond evaporator flows;
  a blowing fan configured to draw air from the storage chamber and to provide the air into the air flow channel;

a defrost sensor disposed on the outflow tube of the roll-bond evaporator or is disposed on the inflow tube of the roll-bond evaporator, the defrost sensor being closer to a first one of the top and the bottom of the roll-bond evaporator than a second one of the top and the bottom of the roll-bond evaporator, wherein the first one is closer to the blowing fan than the second one, wherein the defrost sensor is closer to a third one of the left end and the right end of the roll-bond evaporator than a fourth one of the left end and the right end of the roll-bond evaporator; and a controller configured to sequentially perform a first defrost mode, a storage chamber cooling mode, and a second defrost mode, wherein in the first defrost mode, a compressor is provided in an off state and the blowing fan is to rotate, wherein in the storage chamber cooling mode, the compressor is provided in an on state, and the blowing fan is to rotate, wherein in the second defrost mode, the compressor is provided in an off state and the blowing fan is to rotate.

2. The refrigerator of claim 1, wherein the blowing fan includes a fan motor and a fan housing that receives the fan motor, wherein the fan housing includes:

an air intake guide configured for sucking the air;

a fan flow channel body that surrounds an outer portion of the fan motor; and an ejection guide configured for guiding the air from the fan motor, wherein the fan flow channel body includes first and second guide portions, wherein the first and second guide portions extend away from each other toward the roll-bond evaporator, wherein the defrost sensor is closer to the first guide portion than the second guide portion.

3. The refrigerator of claim 2, wherein the fan motor is provided at a center axis of the duct, wherein the defrost sensor is provided outside the center axis of the duct.

4. The refrigerator of claim 1, wherein the roll-bond evaporator includes:

a front roll-bond evaporator portion spaced apart from the duct; and a rear roll-bond evaporator portion spaced apart from the front roll-bond evaporator portion and the storage chamber body.

5. The refrigerator of claim 4, wherein the defrost sensor is disposed on the front roll-bond evaporator portion or the rear roll-bond evaporator portion.

6. The refrigerator of claim 4, wherein each of the front roll-bond evaporator portion and the rear roll-bond evaporator portion includes the inflow tube and the outflow tube.

7. The refrigerator of claim 6, wherein the defrost sensor is disposed on the outflow tube of the front roll-bond evaporator portion or is disposed on the inflow tube of the front roll-bond evaporator portion.

8. The refrigerator of claim 4, wherein the defrost sensor is disposed on a front face of the rear roll-bond evaporator portion.

9. The refrigerator of claim 6, wherein a thickness of the defrost sensor is less than a gap between the front roll-bond evaporator portion and the rear roll-bond evaporator portion.

10. The refrigerator of claim 1, wherein the controller is configured to control the blowing fan such that, in the storage chamber cooling mode, a blowing fan rotation speed is faster than a blowing fan rotation speed in the first defrost mode.

11. The refrigerator of claim 1, wherein the controller is configured to control the blowing fan such that, in the storage chamber cooling mode, a blowing fan rotation speed is faster than a blowing fan rotation speed in the second defrost mode.

12. The refrigerator of claim 1, wherein a termination temperature of the first defrost mode is lower than a termination temperature of the second defrost mode.

13. The refrigerator of claim 1, wherein a termination temperature of the first defrost mode is lower than a termination temperature of the second defrost mode by 1° C. to 4° C.

14. The refrigerator of claim 1, wherein the controller is configured to rotate the blowing fan until a temperature sensed by the defrost sensor in the first defrost mode reaches a termination temperature of the first defrost mode, wherein the controller is configured to maintain rotating the blowing fan until a temperature sensed by the defrost sensor in the second defrost mode reaches a termination temperature of the second defrost mode, wherein the termination temperature of the second defrost mode is higher than the termination temperature of the first defrost mode.

15. A refrigerator comprising:

a duct arranged to separate a storage chamber body into a storage chamber and an air flow channel, wherein the duct includes an ejection hole;

a roll-bond evaporator disposed in the air flow channel, wherein the roll-bond evaporator has a top, a bottom, a left end and a right end;

a compressor configured to compress refrigerant that flows from the evaporator;

a blowing fan configured to draw air from the storage chamber and to provide the air into the air flow channel;

a defrost sensor closer to a first one of the top and the bottom of the roll-bond evaporator than a second one of the top and the bottom of the roll-bond evaporator, wherein the first one is closer to the blowing fan than the second one, wherein the defrost sensor is closer to a third one of the left end and the right end than a fourth one of the left end and the right end; and a controller configured to sequentially perform a first defrost mode, a storage chamber cooling mode, and a second defrost mode, wherein in the first defrost mode, the compressor is provided in an off state and the blowing fan is to rotate, wherein in the storage chamber cooling mode, the compressor is provided in an on state, and the blowing fan is to rotate, wherein in the second defrost mode, the compressor is provided in an off state and the blowing fan is to rotate, wherein the roll-bond evaporator includes:

a front roll-bond evaporator portion spaced apart from the duct; and a rear roll-bond evaporator portion spaced apart from the front roll-bond evaporator portion and the storage chamber body, wherein the defrost sensor is disposed on the front roll-bond evaporator portion or is disposed on the rear roll-bond evaporator portion.

16. The refrigerator of claim 15, wherein the blowing fan includes a fan motor and a fan housing that receives the fan motor, wherein the fan housing includes:

an air intake guide configured for sucking the air;

a fan flow channel body that surrounds an outer portion of the fan motor; and an ejection guide configured for guiding the air from the fan motor, wherein the fan flow channel body includes first and second guide portions, wherein the first and second guide portions extend away from each other toward the roll-bond evaporator, wherein each of the first and second guide portions is closer to the bottom of the roll-bond evaporator than the top of the first and second guide portions, wherein the defrost sensor is closer to the bottom of the roll-bond evaporator than the top of the roll-bond evaporator, wherein the defrost sensor is closer to one of the first guide portion than to the second guide portion.

17. The refrigerator of claim 15, wherein the controller is configured to control the blowing fan such that, in the storage chamber cooling mode, a blowing fan rotation speed is higher than a blowing fan rotation speed for the second defrost mode.

18. The refrigerator of claim 15, wherein a termination temperature of the first defrost mode is lower than a termination temperature of the second defrost mode by 1° C. to 4° C.

19. The refrigerator of claim 15, wherein the controller is configured to rotate the blowing fan until a temperature sensed by the defrost sensor in the first defrost mode reaches a termination temperature of the first defrost mode, wherein the controller is configured to maintain rotating the blowing fan until a temperature sensed by the defrost sensor in the second defrost mode reaches a termination temperature of the second defrost mode, wherein the termination temperature of the second defrost mode is higher than the termination temperature of the first defrost mode.

20. The refrigerator of claim 1, wherein the defrost sensor comprises a temperature sensor.

21. The refrigerator of claim 15, wherein the defrost sensor comprises a temperature sensor.

22. The refrigerator of claim 1, wherein the blowing fan is provided below the roll-bond evaporator, and wherein the inflow tube and the outflow tube are provided at a bottom of the roll-bond evaporator.

* * * * *